United States Patent [19]

Lobsinger et al.

[11] Patent Number: 4,625,133
[45] Date of Patent: Nov. 25, 1986

[54] ROTARY ELECTRIC MACHINE WITH CENTRIFUGAL FILTER

[75] Inventors: James L. Lobsinger; Jerry D. Wefel, both of Rockford, Ill.

[73] Assignee: Sundstrand Corporation, Rockford, Ill.

[21] Appl. No.: 565,643

[22] Filed: Dec. 23, 1983

[51] Int. Cl.⁴ .............................................. H02K 9/26
[52] U.S. Cl. ....................... 310/56; 310/54; 310/86; 165/119
[58] Field of Search .................. 310/54, 56, 88, 61, 310/90, 64, 87, 261, 264, 265, 51, 60 A, 86, 55, 167, 168, 171, 188; 55/390, 438, 400; 62/317, 474; 165/119

[56] References Cited

U.S. PATENT DOCUMENTS

| | | | |
|---|---|---|---|
| 2,285,436 | 6/1942 | Hoover | 310/87 |
| 2,315,917 | 4/1943 | Arutunoff | 310/87 |
| 3,242,360 | 3/1966 | Carle | 310/87 |
| 3,318,253 | 5/1967 | Campolong | 310/54 |
| 4,139,789 | 2/1979 | Hunt | 310/261 |
| 4,292,174 | 9/1981 | Smith | 210/167 |
| 4,380,712 | 4/1983 | Intichar | 310/52 UX |
| 4,496,862 | 1/1985 | Weber | 310/56 |

FOREIGN PATENT DOCUMENTS

| | | | |
|---|---|---|---|
| 0805408 | 3/1951 | Fed. Rep. of Germany | 310/56 |
| 0771807 | 10/1980 | U.S.S.R. | 310/54 |

Primary Examiner—R. Skudy
Attorney, Agent, or Firm—Wood, Dalton, Phillips, Mason & Rowe

[57] ABSTRACT

A centrifugal filter for a high speed electrical machine of the type having a fluid flow path through its rotor. The centrifugal filter includes an enlargement at the beginning of the flow path through the rotor and which extends radially outwardly of the axis of rotation. As a consequence, contaminants in an incoming fluid stream are subjected to centrifugal force during operation of the machine and moved thereby radially outwardly within the enlargement so as to be out of the fluid stream. Consequently, the fluid stream, after separation of the contaminants therefrom within the enlargement by centrifugal force, may be passed with safety through the rotor for cooling and/or lubricating purposes.

11 Claims, 4 Drawing Figures

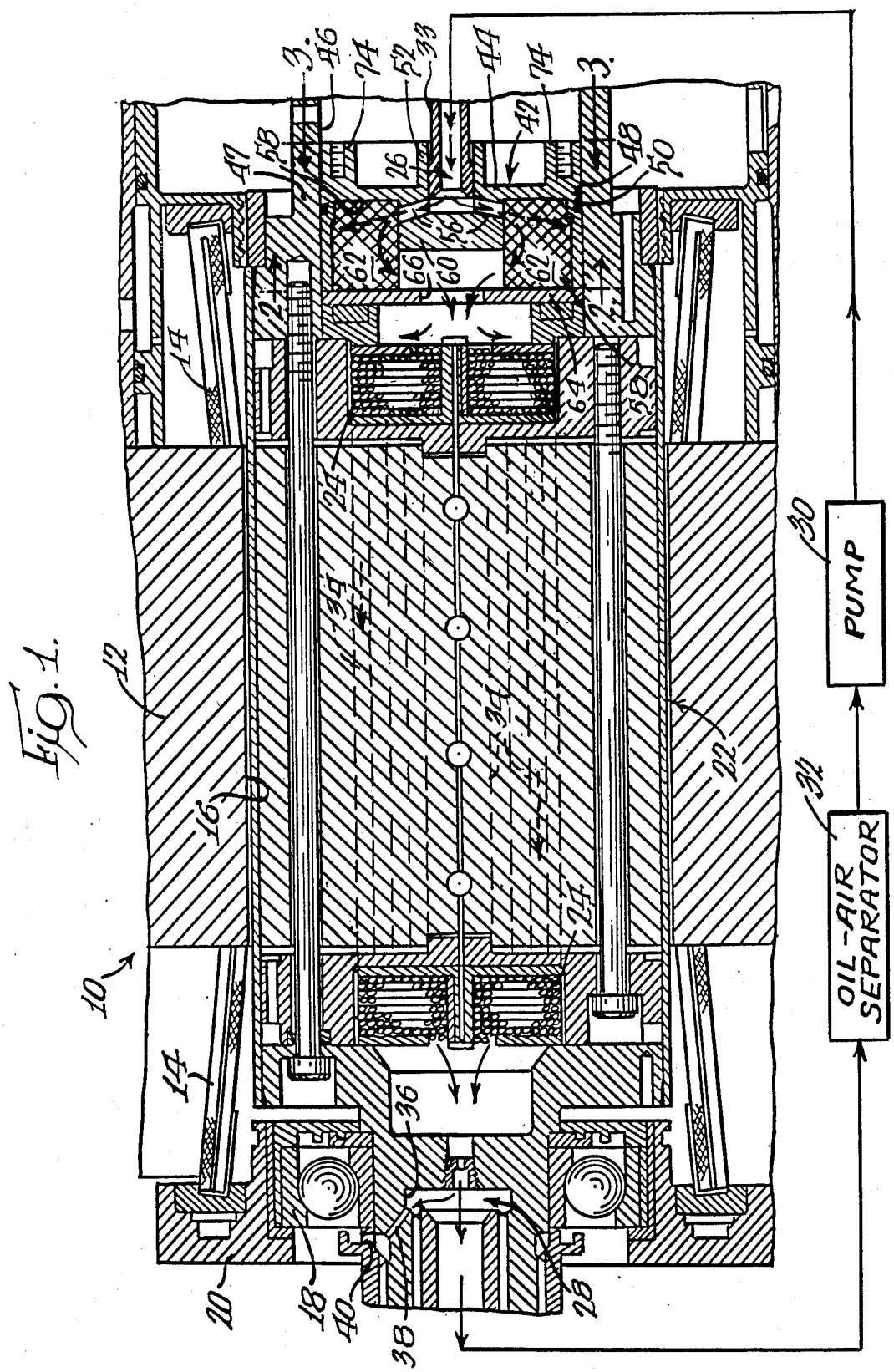

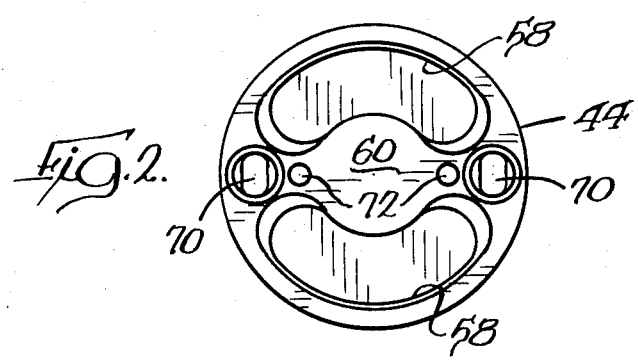
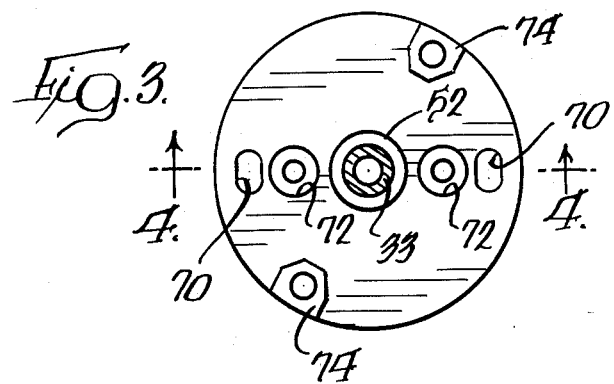
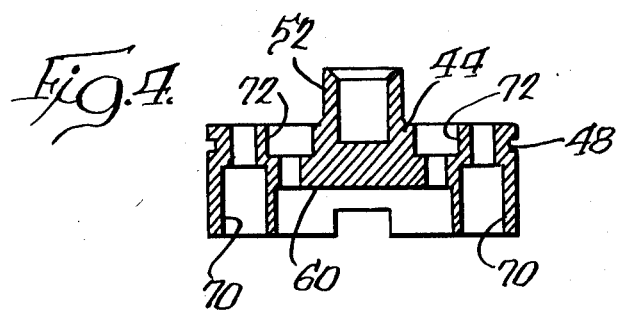

ROTARY ELECTRIC MACHINE WITH CENTRIFUGAL FILTER

TECHNICAL FIELD

This invention relates to rotary electric machines, and more specifically, to rotary electric machines having a centrifugal filter for removing particulate material from a circulated liquid acting as a coolant and/or lubricant.

BACKGROUND ART

Many rotary electric machines as, for example, generators, have a fluid flow path through the rotor. In most cases, a liquid such as oil is circulated through the flow path to provide the dual function of cooling rotor windings to thereby increase the capacity of the machine and to provide for lubrication of bearings journalling the rotor. In some instances, the construction will utilize but one or the other of the two above specified functions, while in others, the fluid may be discharged from the rotor to impinge on stator winding end turns to provide an additional cooling function.

Invariably, impurities, most notably, very small particulates of metal or the like are found in the liquid being circulated. Where the liquid is serving a lubricating function, the presence of such particulates accelerate bearing wear resulting in increased maintenance and/or decreased machine life. Though not as obvious a problem, such foreign material will also shorten machine life where the liquid is employed as a coolant, particularly in those rotary electric machines wherein the coolant passages for winding are formed by the interstices between the windings themselves.

Over a period of time, the particulates lodge in the interstices and impede coolant flow. As particle build-up continues, coolant flow is progressively lessened with the consequence that hot spots in the windings develop. Ultimately, the insulation on the windings will fail at the hot spot causing short circuiting and machine failure.

It has thus been proposed to filter the coolant. See, for example, U.S. Pat. No. 3,242,360 issued Mar. 22, 1966 to Carle wherein what appears to be a conventional filter is installed in the coolant flow path of a submersible pump.

While this approach may work well in many applications, it is not satisfactory in many instances where the rotary electric machine is one which operates at high speed. For example, aircraft generators are typically operated at 12,000 rpm or more and in such operation, extremely fine oil contaminants which may escape a conventional filter media are subjected to high gravitational loads during operation due to centrifugal force. The large forces tending to move such fine contaminants are disposed to move them radially outwardly and since, for convenience, most rotary electric machines locate coolant inlets and outlets to the rotor on the axis of rotation, and yet have coolant flow paths spaced from the axis of rotation, it is extremely difficult, if not impossible, to entrain such fine particles in the coolant stream sufficiently to move them radially inwardly within the rotor the fluid outlet therefrom. As a consequence, the coolant passages displaced from the axis of rotation slowly become plugged ultimately resulting in failure of the machine.

The present invention is directed to overcoming one or more of the above problems.

SUMMARY OF THE INVENTION

It is the principal object of the invention to provide a new and improved rotary electric machine with means for filtering fluid being passed to the rotor thereof.

According to the invention there is provided a rotary electric machine including a stator and a rotor journalled for rotation relative to the stator about an axis of rotation. A fluid flow path extends through the rotor and an inlet is located on the rotor to the fluid flow path, the inlet being on the axis of rotation of the rotor.

According to the invention, there is provided an enlargement of the flow path adjacent the inlet which extends radially outwardly of the axis. By this structure, centrifugal separation of fine particulates from the fluid being passed to the flow path occurs in the enlargement. Consequently, fluid exiting the enlargement and traveling through the remainder of the flow path is relatively contaminant free such that the liquid may be advantageously employed in cooling windings and/or lubricating bearings without fear of the deleterious effects of entrained particulate contaminant in the fluid.

According to a preferred embodiment of the invention, the enlargement is provided with a particle retaining means to prevent the particles from exiting the enlargement when the machine is quiescent.

In a highly preferred embodiment, the retaining means is a fine wire mesh.

The invention contemplates that the enlargement has a fluid exit located radially inwardly of the radially outermost part of the enlargement. Thus, due to centrifugal separation of fine contaminants from the fluid in the enlargement, and the fact that centrifugal force will tend to maintain the contaminants radially outwardly of the fluid due to differences in density, this structure assures that fluid exiting the enlargement will be free of fine contaminants.

Other objects and advantages will become apparent from the following specification taken in conjunction with the accompanying drawings.

DESCRIPTION OF THE DRAWINGS

FIG. 1 is a sectional view, partially fragmentary, of a rotary electric machine, namely, a high speed generator, embodying the invention;

FIG. 2 is a sectional view taken approximately along the line 2—2 of FIG. 1;

FIG. 3 is a sectional view taken approximately along the line 3—3 of FIG. 1; and FIG. 4 is a sectional view taken approximately along the line 4—4 in FIG. 3.

BEST MODE FOR CARRYING OUT THE INVENTION

An exemplary embodiment of a rotary electric machine made according to the invention is illustrated in FIG. 1 in the form of a high speed generator. Specifically, a two pole, 24,000 rpm generator for aircraft use is shown. However, it should be understood that the invention can be employed with efficacy in other types of rotary electric machines wherein rotor cooling and/or bearing lubrication involves the provision of a fluid flow path through the rotor.

The machine includes a stator armature, generally designated 10, having a steel core 12, windings 14 (only the end turns of which are shown), and a rotor/stator air gap 16. Bearings such as those shown at 18 mounted on a housing component 20 serve to journal a rotor, generally designated 22, for rotation relative to the stator 10 within the gap 16 about the longitudinal axis of the rotor 22.

In the particular form of machine illustrated, the generator is of the so-called brushless variety and includes windings 24 extending from end to end of the rotor 22 as illustrated. The windings receive a direct current to generate a magnetic field which in turn rotates upon rotation of the rotor to induce current in the windings 14 of the stator 10.

The rotor 22 includes a fluid inlet, generally designated 26, at one end and a fluid outlet, generally designated 28, at the other. A fluid system including a pump 30 and an air-oil separator 32, if desired, is operable to recirculate a liquid coolant/lubricant from the outlet 28 to the inlet 26 via a transfer tube 33 disposed within the inlet 26.

Within the rotor 22, the inlet 26 and outlet 28 are connected by a fluid flow path 34 displaced from the axis of rotation and defined by the interstices between the windings 24. However, it is to be understood that if desired, the fluid flow path 34 could be defined by passages formed within the rotor. The essential characteristic of the fluid flow path 34 is that a portion of the same be in heat exchange relation with the windings 24 so that the latter may be cooled by the passage of a suitable fluid, such as oil, through the flow path 34.

Where the fluid being passed through the rotor 22 is being utilized for lubrication purposes, the outlet 28 may include an annulus 36 and ports such as shown at 38 and 40 extending from the annulus to the bearings 18. Consequently, lubricating fluid will be directed to the bearings 18 by this structure.

Immediately downstream of the inlet 26 is a centrifugal filter, generally designated 42. The filter 42 is carried by the rotor 22 and is operative to separate fine contaminants from the incoming fluid stream before the stream is passed to the flow path 34 for cooling and/or lubricating purposes.

The filter 42 is formed by a casting 44 suitably machined for receipt within a bore 46 in an end shaft 47 forming part of the rotor 22.

As seen in FIGS. 1 and 4, the casting 44 is provided with a peripheral, radially outwardly opening groove 48 which in turn receives an O-ring seal 50 whereby the casting 44 may be sealed against the interior of the bore 46.

Centrally of the casting 44 is a sleeve-like formation 52 which receives the transfer tube 33 and defines the inlet 26. As seen in FIG. 1, the interior of the sleeve-like formation 52 is in fluid communication with a plurality of generally radial ports 56 which extend to enlargements or cavities 58 within the casting 44. The cavities 58 are located substantially radially outwardly of the rotor axis such that the contents thereof will be subjected to the high gravitational forces induced by centrifugal force during rotation of the rotor 22.

The center of the casting 44 is provided with a central solid section 60 in which the ports 56 are formed such that the solid section 60 serves as a baffle to assure that incoming fluid is directed radially outwardly to the cavities 58.

As seen in FIGS. 1 and 4, the solid section 60 does not extend the full axial extent of the casting 44 but is recessed therefrom so as to allow radially inwardly directed fluid flow from the cavities 58 toward the rotational axis of the rotor as shown by the solid line arrows in FIG. 1.

The cavities 58 are filled with a means for retaining particulate material. In a preferred form of the invention, such means are constituted by fine wire mesh 62 formed from stainless steel or the like.

The cavities 58, with the mesh 62 in place, are closed by a closure 64 having a central opening 66 which is, as illustrated in FIG. 1, in fluid communication with the windings 24, and thus the flow path 34.

As seen in FIGS. 2 and 4, between adjacent ends of the cavities 58 there may be located stepped bores 70. Though not shown, the bores 70 receive electric leads from a source of direct current extending to the winding 24 for energization purposes.

Just radially inwardly thereof may be oppositely directed stepped bores 72 for receipt of fasteners (not shown) which could be employed for holding the casting 44 axially in the location illustrated in FIG. 1 and/or for securing the closure 64 thereto. Bosses 74 may be located on the casting 44 for receipt of fasteners for mounting other components (not shown) of the generator.

In operation, an incoming fluid for both cooling the windings 24 and lubricating the bearings 18 enters the rotor on the rotational axis thereof via the inlet 26. The solid section 60 together with the ports 56 directs the incoming flow in the radially outward direction and as the same moves progressively radially outwardly, it is subjected to higher and higher gravitational loads due to centrifugal force when the generator is in operation. The fluid enters the mesh 62 within the cavities 58 and ultimately, the pressure of incoming fluid will drive the same radially inwardly as illustrated by the arrows such that it passes through the opening 66 to the fluid flow path 34 and ultimately to the outlet 28 and/or the bearings 18.

The contaminants, typically being metal, will have a higher density than the incoming coolant and thus will be subjected to greater centrifugal loading during operation of the machine when they are displaced from the rotational axis of the rotor 22, that is, when they are in the cavities 58. As a consequence, they will tend to move radially outwardly through the mesh 62 to the radially outer side of the corresponding cavity 58 and lodge thereagainst as shown by the dotted arrows in FIG. 1. Because the outlet defined by the opening 66 from the cavities 58 is on the rotational axis but, in any event, is located radially inwardly of the radial outer extent of the cavities 58, the contaminants will not move thereto during operation because of the centrifugal loading.

When the machine is quiescent, i.e., the rotor is not being rotated, the contaminants might be expected to move under the influence of gravity or other forces that might be encountered in a given environment toward the rotational axis of the rotor such that they could ultimately enter the flow path 34. Such movement is, however, prevented by the presence of the mesh 62 within the cavity which, while allowing the contaminants to pass when they are subjected to high loads during operation, is of sufficiently small size to prevent free movement at all other times.

From the foregoing, it will be appreciated that a centrifugal filter made according to the invention is ideally suited for use in high speed rotary electric machines and prevents the entry of fine contaminants into coolant passages which could be plugged thereby and- /or bearings which could be abraded thereby. It should be recognized that the configuration of the cavities 58 illustrated in the drawings is not a critical aspect of the invention and that in some instances, a single peripheral cavity, or a plurality greater than two of the cavities can be employed. The configuration illustrated is utilized in the present invention to accommodate the passage of fasteners, electric leads, etc. whose location may be varied dependent upon the location of other rotor components as desired.

We claim:

1. In a rotary electric machine, the combination of:
   a stator;
   a rotor journalled for rotation relative to the stator about an axis of rotation;
   electric windings carried by said rotor;
   means defining a fluid coolant flow path through said rotor in heat exchange relation with said winding whereby the windings and the rotor may be cooled;
   a fluid coolant inlet on said rotor; and
   a centrifugal filter carried by said rotor and interposed in fluid flow relation between said flow path and said inlet.

2. The rotary electric machine of claim 1 wherein said filter includes a filter cavity in fluid communication with said inlet and an outlet connected to said flow path; said outlet being located radially inwardly of the radially outer portion of said cavity so that particulate material in fluid received in said cavity will move by centrifugal force during rotation of said rotor to a location in said cavity radially outwardly of said outlet.

3. The rotary electric machine of claim 2 wherein there are particle retaining means within said cavity for holding and retaining particles separated from the fluid in the cavity.

4. The rotary electric machine of claim 3 wherein said particle retaining means comprise a wire mesh.

5. The rotary electric machine of claim 1 including bearings journalling said rotor and in fluid communication with said flow path and adapted to be lubricated by the fluid coolant.

6. In a rotary electric machine, the combination of:
   a stator;
   a rotor;
   bearings journalling said rotor for rotation relative to the stator about an axis of rotation;
   means defining a lubricant flow path through said rotor to said bearings;
   a lubricant inlet on said rotor; and
   a centrifugal filter carried by said rotor and in said flow path between said inlet and said bearings.

7. The rotary electric machine of claim 6 wherein said rotor carries windings and a portion of said flow path is in heat exchange relation with said windings, said filter being located in said flow path between said portion of said inlet.

8. In a rotary electric machine, the combination of:
   a stator;
   a rotor journalled for rotation relative to said stator about an axis of rotation;
   a fluid flow path extending through said rotor;
   an inlet on said rotor to said flow path and being on said axis; and
   an enlargement of said flow path adjacent said inlet and extending radially outwardly of said axis.

9. The rotary electric machine of claim 8 further including particle retaining means within said enlargement.

10. The rotary electric machine of claim 8 wherein said enlargement has a fluid exit located radially inwardly of the radially outermost part of said enlargement.

11. The rotary electric machine of claim 8 further including means in said enlargement for directing fluid received from said inlet in a radially outward direction.

* * * * *